United States Patent
Alzner et al.

(10) Patent No.: US 7,053,396 B2
(45) Date of Patent: May 30, 2006

(54) APPARATUS AND PROCESS FOR RETRIEVING INFORMATION PROJECTED IMAGE-WISE ON A REUSABLE STORAGE FILM RESTORING SAME

(75) Inventors: Edgar Alzner, Garden City, NY (US); Frederick R. Fischer, Farmingdale, NY (US); Stephen Zamprelli, Bardonia, NY (US)

(73) Assignee: Air Techniques, Inc., Hicksville, NY (US)

( * ) Notice: Subject to any disclaimer, the term of this patent is extended or adjusted under 35 U.S.C. 154(b) by 3 days.

(21) Appl. No.: 10/919,123

(22) Filed: Aug. 16, 2004

(65) Prior Publication Data
US 2005/0040353 A1 Feb. 24, 2005

Related U.S. Application Data

(60) Provisional application No. 60/496,860, filed on Aug. 21, 2003.

(51) Int. Cl.
*G03B 42/08* (2006.01)

(52) U.S. Cl. ............................................... 250/584
(58) Field of Classification Search ................ 250/584
See application file for complete search history.

(56) References Cited

U.S. PATENT DOCUMENTS

| 4,975,580 A | * | 12/1990 | Ohgoda et al. ............. 250/589 |
| 6,466,352 B1 | * | 10/2002 | Shahar et al. ............... 359/212 |
| 6,599,014 B1 | * | 7/2003 | Thoms ........................ 378/184 |

* cited by examiner

*Primary Examiner*—David Porta
*Assistant Examiner*—Marcus Taningco
(74) *Attorney, Agent, or Firm*—Clifford G. Frayne; Louis E. Marn

(57) ABSTRACT

There is disclosed an apparatus and process having positioning surface for a reusable storage film having information projected image-wise therein wherein the image-wise containing storage film is advanced by a transportation assembly through an information retrieval or interrogation assembly and thence introduced into a restoration collection chamber including a source of light at an energy level sufficient to remove residual image information thereby restoring the storage film to a condition of reuse.

12 Claims, 3 Drawing Sheets

APPARATUS AND PROCESS FOR RETRIEVING INFORMATION PROJECTED IMAGE-WISE ON A REUSABLE STORAGE FILM RESTORING SAME

RELATED APPLICATIONS

Applicant claims the benefit of provisional application 60/496,860, filed Aug. 21, 2003.

BACKGROUND OF THE INVENTION

1. Field of the Invention

The present invention relates to radiographic imaging, and more particularly to an apparatus and process for digitally retrieving information projected onto a reusable radiographic film with subsequent restoration processing of such radiographic film to permit further use thereof.

2. Description of the Prior Art

Traditional x-ray imaging systems using silver-based films are being replaced by radiographic imaging systems using photo-stimulable phosphor imaging films or substrates eliminating the need for physical storage of the imaged film since digital retrieval of the image information includes input and computer storage permitting viewing of such information on a viewer, such as CRT tube assembly. Additionally, such computer stored image information permits facile electronic transmission to any preselect location obviating physical transfer of the thus formed image on the imaging film. In U.S. Pat. No. 5,874,744 to Goodman, et al., assigned to the same assignee as the present invention, there is disclosed a process and apparatus for processing radiographic information from an anisotropic storage phosphor screen including an opto-electro-mechanical assembly to achieve faster scan of an interrogating beam and including detector and computer assembly, herein incorporated by reference.

The prior art is replete with a plethora of radiographic imaging information assemblies for reading projected image-wise information from a stimuable phosphor sheet, film or substrate, e.g. see U.S. Pat. No. 6,624,457 to Kohada wherein excitation light emits photostimulated luminescent light from the stored energy of the projected image-wise information. In such disclosure, the plate, film, sheet or substrate is disposed on a horizontal support surface and interrogated by an excitation scanning assembly.

In U.S. Pat. No. 6,599,004 to Thoms, there is disclosed a device for reading flexible storage foils wherein the flexible storage film having image-wise projected information is positioned on a cylindrically-shaped surface and is caused to be linearly moved there over while being interrogated or scanned via a slot by a light beam generated in a helical line in a continuous manner from a point disposed at the axis of the cylindrically-shaped surface. At the conclusion of the reading process, the flexible storage film is caused to be returned to its starting position with the thus read storage film being thereafter separately processed to remove any latent image by exposure to light to cause trapped charged electrons to be dissipated thereby restoring the storage film for use in a subsequent receiving projected imaging information process.

In U.S. Pat. No. 6,762,430 to Alzner, et al. and assigned to the same assignee as the present invention, there is described a plate guide system for dental imaging plates for use in the hereinabove described U.S. Pat. No. '014 to Thoms.

Restoration of a scanned image storage film in either disclosure obviously requires a separate and distinct restoration process. Any such two step procedure can very readily lead to the inadvertent non-processing of the storage film to a restoration process thereby resulting in the possible use of an image containing storage foil with concomitant unnecessary time and effort to rectify the use of an unrestored storage film. Consequently, there is a need for an apparatus and process for processing reusable storage films, plate and the like including the reading of latent images thereon with concomitant restoration of imaging capabilities in a manner to unequivocally ensure valid reuse of a storage film, plate or the like void of any latent image information.

As used herein, the term "reusable storage film" is a flexible substrate formed with a layer of a photo-stimulable phosphors which is capable of imaging with ionizing radiation or x-rays which after imaging may be interrogated or scanned with a source of light energy to produce photo-stimulated luminescence information capable of being digitally read and stored.

OBJECTS OF THE INVENTION

An object of the present invention is to provide an apparatus and process for in seriatim reading and restoration of reusable storage films.

Another object of the present invention is to provide an apparatus and process for in seriatim reading and restoration of reusable storage film prior to reuse of the storage film.

Yet another object of the present invention is to provide an apparatus and process for in seriatim reading and restoration of reusable storage film substantially eliminating the possible use of an unrestored storage film.

A still further object of the present invention is to provide an apparatus and process for in seriatim reading and restoration of reusable storage film facilely operated by a user.

SUMMARY OF THE INVENTION

These and other objects of the present invention are achieved by an apparatus and process having a positioning surface for a reusable storage film having image-wise projected information therein wherein the storage film is advanced by a transportation assembly through an information retrieval or interrogation assembly and thence introduced into a restoration chamber including a source of light at an energy level sufficient to remove residual image information thereby restoring the storage to a condition of use.

BRIEF DESCRIPTION OF THE DRAWINGS

Further objects and advantages of the present invention will become more readily apparent by reference to the following detailed description thereof when taken with the accompanying drawings wherein like numerals designate like parts throughout and wherein.

DETAILED DESCRIPTION OF THE INVENTION

Figure 2:
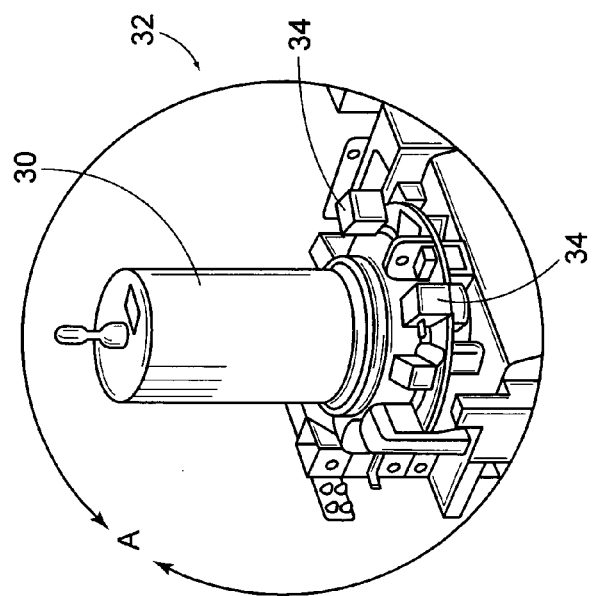
FIG. 2 is a partial enlarged view of the positioning and transportation assembly of the present invention.
Figure 1:
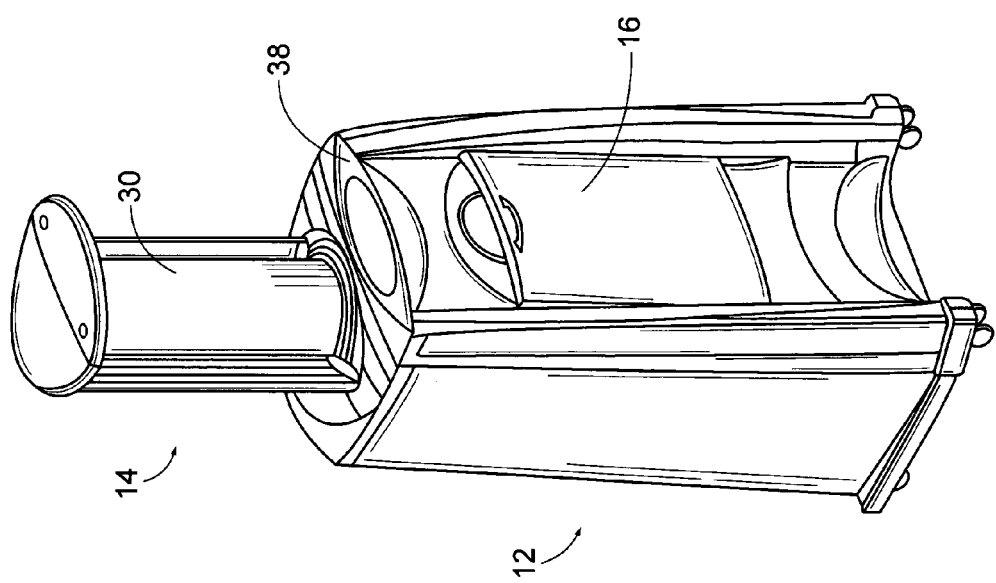
FIG. 1 is an isometric view of the apparatus of the present invention.
Figure 3:
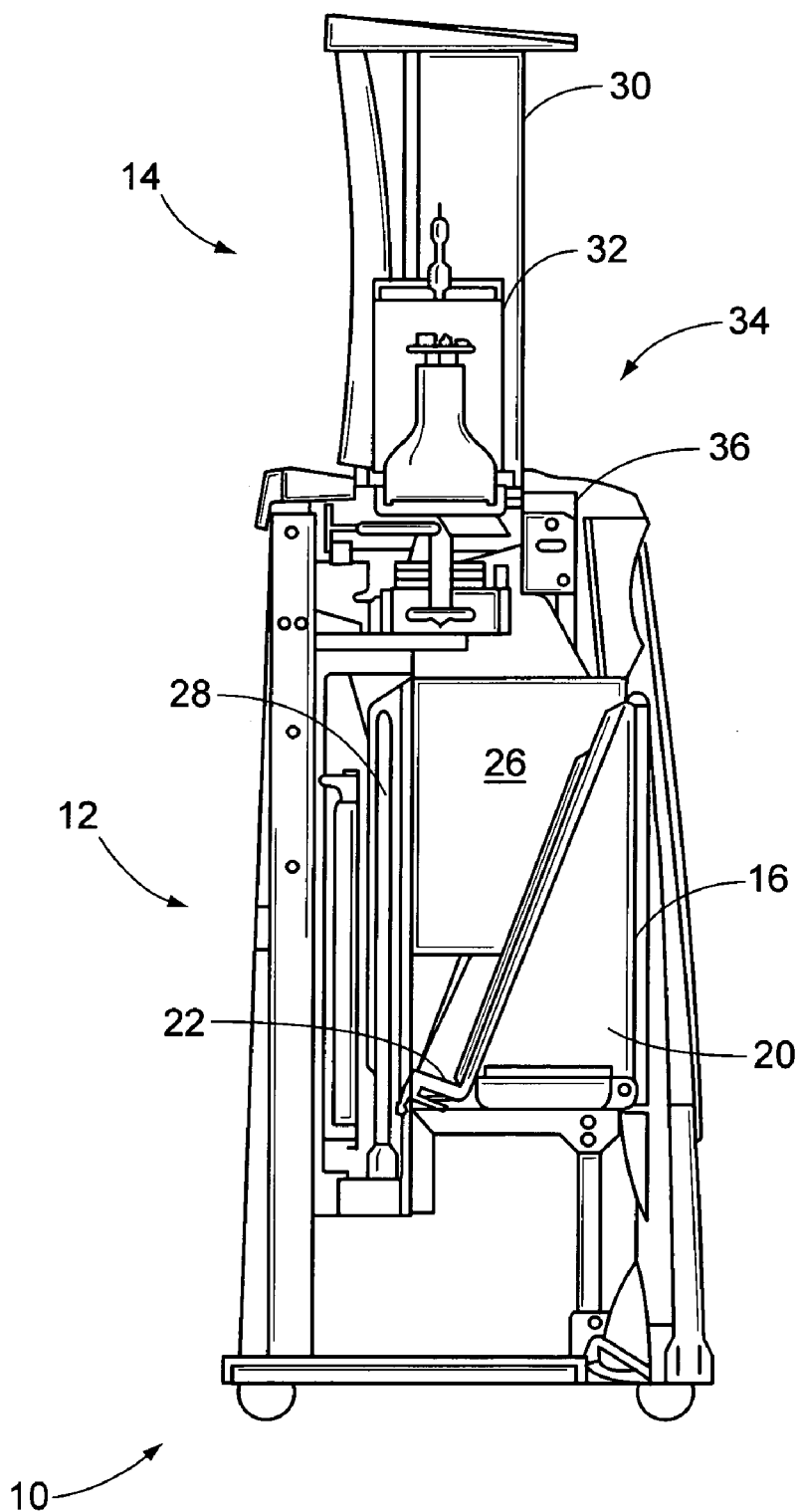
FIG. 3 is a cross-sectional side view of the apparatus of FIG. 1 taken along a center line of the vertical axis of FIG. 1.
Figure 4:
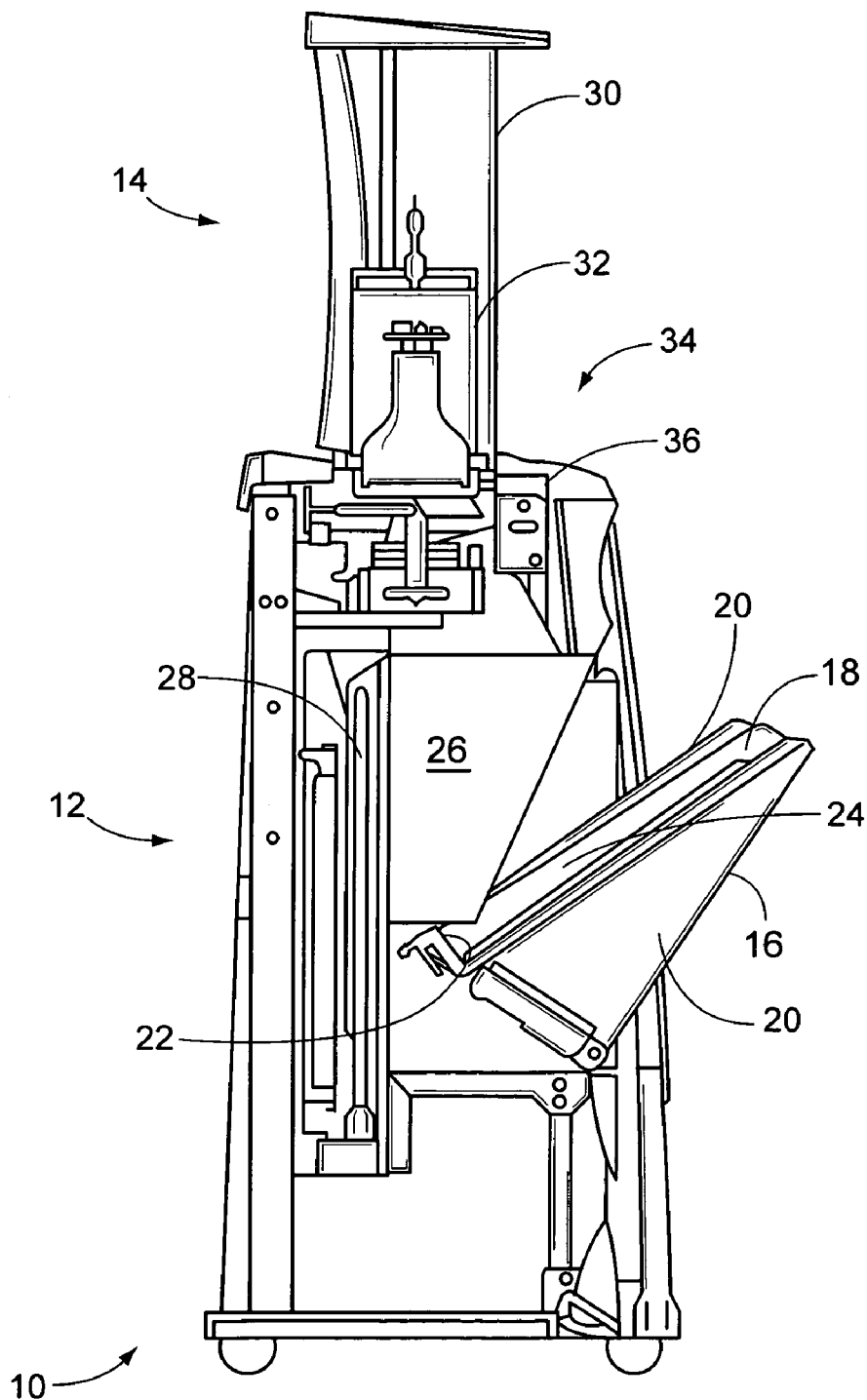
FIG. 4 is a cross sectional side view of the apparatus of FIG. 3 illustrating access to the restoration chamber of the apparatus of the present invention.

Referring now to the drawings and particularly FIG. 1, there is illustrated a reading and restoration assembly for reusable storage films, generally indicated as 10, comprised of lower housing or base portion, generally indicated as 12, on which is mounted a scanning assembly, generally indicated as 14. The lower housing portion 12 is comprised of a horizontally-mounted front door member 16, also referring to FIGS. 3 and 4 including a vertically and angularly-disposed bottom wall member 18 having inwardly extending vertical side walls 20 and an end wall 22 defining a collection drawer like chamber 24 for receiving scanned storage films, as more fully hereinafter discussed. The width dimension of the door member 16 is greater than the largest width size of any storage film to be processed.

The lower housing portion 12 is provided with downwardly depending inner wall members 26 disposed inwardly from the side walls 18 to guide scanned storage films into the collection chamber 24. A light source, generally indicated as 28, is positioned in opposing relationship to the collection chamber 24, at least co-extensive to the height and width dimension of the door member 16 and provides a source of light energy necessary to discharge trapped electrons in scanned storage films to restore imaging capability.

The upper scanning assembly 14 is comprised of a cylindrically-shaped support surface 30 for positioning an imaged storage film thereabout and encloses a photomultiplier assembly, generally indicated as 32. Disposed below the photomultiplier assembly 32, there is provided a transportation assembly generally indicated as 34 including a plurality of roller and belt member assembly 34 for passing an imaged storage film downwardly passed a cylindrically-shaped slot (not shown) as described in the aforementioned U.S. Pat. No. '914 to Thoms, herein incorporated by reference, for interrogation or scanning by a focusing beam of photons, i.e. light to digitally generate photo-stimulated luminescence to be measured and stored in an appropriate computer assembly, such as described in the aforementioned patent to Goodman, et al.

The assembly 10 is provided with a control panel, generally indicated as 40, including a control member for initiating operation of the assembly 10 under the control of a CPU unit prior to positioning of an imaged storage film on the supporting surface. Such CPU unit includes programs to process the projected imaged storage film during passage through the assembly 10 and includes indicator lights providing status information on the storage film being processed through completion of the restoration process.

In operation, the assembly 10 is activated and an imaged storage film (not shown) is positioned about the cylindrically-shaped support surface which is sensed to cause activation of the transportation assembly 32 whereby the roller and belt assemblies 34 are caused to rotate in a manner to effect downwardly displacement of the imaged storage film about the support surface 30 and thence linearly advanced passed the slot wherein a light beam is caused to interrogate and digitally generate photo-stimulated luminescent light which is evaluated and stored, such as disclosed in the aforementioned patent to Goodman, et al.

During generation of the photo-stimulated luminescent light, the imaged storage film is being introduced into the lower housing portion 12 and guided by wall members towards the collection chamber 22. A point is reached when the roller and belt assemblies 34 are no longer in contact with the imaged storage film whereupon the thus read storage film is caused to drop by gravity into the collection chamber 22 with a leading edge thereof causing to come to rest against the end wall of the door member of the lower housing portion 12 and sensed by an appropriate control member.

Upon sensing the positioning of the thus read imaged storage film in the collection chamber, the light source 26 is activated and caused to remain activated for a preselect time to ensure discharge of trapped electrons in the storage film thereby restoring image capabilities of the storage film. An appropriate control member generates a signal on the control panel 40 at completion of the restoration process.

It will be appreciated that a plurality of imaged storage films may be sequentially processed before a need to remove process storage film from the collection chamber of the door member 16 by causing the door member 16 to be rotated outwardly thereby permitting physical access to the collection chamber 22 and restored storage film.

It is understood that should the interrogating of the storage film generate inadequate or invalid information, that the imaged storage plate is returned to a starting position and an error signal generated to alert user. Additionally, it will be understood that the assembly 10 may be used to process storage films which have been restored but not used for a time period and then subject to miscellaneous radiation.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

What is claimed is:

1. An apparatus for retrieving information stored imagewise on a reusable storage film and the restoration thereof, which comprises:
    a positioning surface for said reusable storage film having an image projected thereon;
    means for scanning said image projected on said reusable storage film;
    means for collecting said scanned reusable storage film;
    said collecting means is provided on a front door member hingeably mounted to said apparatus;
    said front door member includes a drawer-like member comprised of a bottom wall, side walls, and end wall member defining a collection chamber;
    said drawer-like member is disposed in a downward vertical position;
    further including vertically-disposed side walls disposed inwardly of said side walls of said drawer-like member to guide said scanned storage film into said collection chamber;
    means for transporting said reusable storage film through said scanning means and passing same into said collecting means; and
    light means for illuminating said thus scanned storage film to discharge trapped electrons to thereby restore said storage film to a condition for use.

2. The apparatus for retrieving information stored imagewise on a reusable storage film as defined in claim 1 wherein said positioning surface is cylindrically-shaped.

3. The apparatus for retrieving information stored imagewise on a reusable storage film as defined in claim 1 wherein said transporting means including a plurality of roller and belt assemblies.

4. The apparatus for retrieving information stored imagewise on a reusable storage film as defined in claim 1 wherein said scanning means is positioned above said collecting means whereby scanned storage film drops by gravity into said collecting means after disengagement with said transporting means.

5. The apparatus for retrieving information stored image-wise on a reusable storage film as defined in claim 1 wherein said light means is disposed in opposing relationship to said collecting means.

6. The apparatus for retrieving information stored image-wise on a reusable storage film as defined in claim 5 wherein said light means is at least coextensive to said collecting means.

7. The apparatus for retrieving information stored image-wise on a reusable storage film as defined in claim 1 wherein said collecting means is of a width greater than a width of the largest storage film to be processed in said apparatus.

8. The apparatus for retrieving information stored image-wise on a reusable storage film as defined in claim 1 and further including indicator means for signaling completion of restoration of said storage film in said collecting means.

9. A process for retrieving information stored image-wise on a reusable storage film, which comprises:
   transporting an image-wise containing reusable storage film through a scanning zone;
   interrogating said storage film with a light to digitally generated photo-stimulated luminescent light;
   storing said digitally generated photo-stimulated luminescent light;
   continuing transportation of said storage film into a collecting means;
   said collecting means is provided on a front door member hingeably mounted to said apparatus;
   said front door member includes a drawer-like member comprised of a bottom wall, side walls, and end wall member defining a collection chamber;
   said drawer-like member is disposed in a downward vertical position;
   further including vertically-disposed side walls disposed inwardly of said side walls of said drawer-like member to guide said scanned storage film into said collection chamber; and
   subjecting said thus transported image-wise containing storage film to light energy sufficient to discharge electrons to thereby restore and storage film for reuse.

10. The process for retrieving information stored image-wise on a reusable storage film as defined in claim 9 wherein said reusable storage film is disposed on a positioning surface prior to introduction into said scanning zone.

11. The process for retrieving information stored image-wise on a reusable storage film as defined in claim 9 wherein said thus scanned storage film is passed by gravity into said collection zone.

12. The process for retrieving information stored image-wise on a reusable storage film as defined in claim 9 wherein restoration light energy is initiated by sensing of said scanned storage film in said collection zone.

* * * * *